(12) United States Patent
Ito et al.

(10) Patent No.: US 6,722,178 B1
(45) Date of Patent: Apr. 20, 2004

(54) AUTOMATIC BENDING SYSTEM AND MANIPULATOR FOR THE SYSTEM

(75) Inventors: Katsuhide Ito, Turin (IT); Paolo Ariagno, Turin (IT); Stefano Vergano, Turin (IT)

(73) Assignee: Amada Company, Limited (JP)

( * ) Notice: Subject to any disclaimer, the term of this patent is extended or adjusted under 35 U.S.C. 154(b) by 0 days.

(21) Appl. No.: 09/958,091

(22) PCT Filed: Apr. 7, 2000

(86) PCT No.: PCT/JP00/02277

§ 371 (c)(1),
(2), (4) Date: Oct. 5, 2001

(87) PCT Pub. No.: WO00/61315

PCT Pub. Date: Oct. 19, 2000

(30) Foreign Application Priority Data

Apr. 7, 1999 (IT) .................................. TO99A0268
Apr. 7, 1999 (IT) .................................. TO99A0269

(51) Int. Cl.[7] .................................................. B21J 13/10
(52) U.S. Cl. .......................... 72/420; 72/389.3; 72/422; 414/736; 414/751.1
(58) Field of Search .......................... 72/420, 422, 298, 72/299, 305, 389.1, 389.3; 414/736, 751.1; 901/30, 31; 294/87.1

(56) References Cited

U.S. PATENT DOCUMENTS

| 4,723,353 A | * | 2/1988 | Monforte ..................... 483/10 |
| 4,904,131 A | | 2/1990 | Affaticati |
| 4,930,976 A | * | 6/1990 | Spacher et al. ........... 414/744.8 |
| 4,989,444 A | * | 2/1991 | Murakami et al. ............. 72/422 |
| 5,312,220 A | | 5/1994 | Torii et al. |
| 5,471,738 A | * | 12/1995 | Burcham et al. .............. 29/701 |
| 5,727,415 A | * | 3/1998 | Alitalo ....................... 72/389.3 |
| 5,950,485 A | * | 9/1999 | Sartorio ....................... 72/422 |
| 6,125,683 A | * | 10/2000 | Toeniskoetter ............... 72/426 |

FOREIGN PATENT DOCUMENTS

| EP | 0354559 | 7/1990 |
| EP | 0587941 | 12/1994 |
| EP | 0824977 | 9/1998 |
| GB | 2265563 | 10/1993 |
| JP | 59-174278 | 10/1984 |
| JP | 06-254627 | 9/1994 |
| JP | 06-262576 | 9/1994 |

\* cited by examiner

*Primary Examiner*—Ed Tolan
(74) *Attorney, Agent, or Firm*—Blank Rome LLP

(57) ABSTRACT

An automatic bending system includes an automatic bending press (46) including a pair of bending tools (48, 50) cooperating with each other, and an automatic manipulator (10) including a head (26) movable in a work space and provided with a toolholder member (29) intended to receive at least two take-up members (32, 34, 38, 42) independent from each other. The head (26) is rotatable about a first axis (28) and the toolholder member (29) is provided with tool attachment seats (30) arranged on opposite sides of said first axis (28) and rotatable about a second common axis (36) orthogonal to the first axis (28).

5 Claims, 11 Drawing Sheets

AUTOMATIC BENDING SYSTEM AND MANIPULATOR FOR THE SYSTEM

TECHNICAL FIELD

The present invention relates to an automatic bending system which includes an automatic bending press including a pair of cooperating bending tools, and an automatic manipulator including a head movable in a work space and provided with a toolholder intended to receive at least two take-up members independent from each other.

BACKGROUND ART

In a conventional bending system of this type, the manipulator is programmed for supplying pieces of sheet metal to the bending press, for holding and moving the pieces during the bending cycles and for releasing the pieces at the end of the bending cycles. The bending cycle of a piece of sheet metal generally comprises the step of picking-up the single sheets from a pack in which the sheets are vertically staked. In the vast majority of cases, a take-up member with aspirating suckers is used for carrying out this operation. Any other type of take-up member would render extremely more complex the pick-up of a single sheet from a pack. The take-up members with aspirating suckers often are not suitable for holding the sheets during the bending cycles, especially when the pieces are small, when they must be held by the take-up member along an edge or when the resiliency of the suckers would prevent reaching the desired precision of positioning of the piece.

For this reason, manipulators for automatic bending systems having a head provided with two independent take-up members, formed for instance by a take-up member with aspirating suckers and by a gripper, have already been produced. One of the problems which can arise when two or more take-up members placed on the same head are used is the risks that such take-up member may interfere with each other or with other parts of the manipulator or of the bending press during the operation.

Furthermore, known manipulators of this type comprise a first motor dedicated to controlling the rotation of the head and a second motor dedicated to controlling the rotation of the toolholder. This solution does not allow to take maximum advantage of the available capacity of the motors, especially when the working program of the manipulator does not provide for the contemporaneous use of the first and second axis.

DISCLOSURE OF THE INVENTION

An object of the present invention is to provide a bending system of the type defined at the beginning of the description which has a simple and compact structure, which attains the maximum freedom of movement and which avoids interference with the take-up members.

Another object of the present invention is to provide a manipulator of the type specified above, which permits to exploit in the best possible way the capacity of the motors and which, remaining the same the other conditions, enables the use of smaller and less expensive motors.

According to the present invention, this object is achieved by a bending system comprising: an automatic bending press (46) including a pair of bending tools (48, 50) cooperating which each other, and an automatic manipulator (10) including a head (26) movable in a work space and provided with a toolholder member (29) intended to receive at least two take-up members (32, 34, 38, 42) independent from each other, characterised in that the head (26) is rotatable about a first axis (28) and that the toolholder member (29) is provided with two tool attachment seats (30) arranged on opposite sides of said first axis and rotatable about a common second axis (36) orthogonal to the first axis (28).

According to the present invention, this object is achieved by a manipulator of the type specified above, characterised in that the head is inserted in an epicycloidal gearing including: two tootheaded input members, each of which is rotatable about an axis which is fixed with respect to the arm, the two tootheaded members being driven in rotation independently from each other by respective motors, and at least one planet gear rotatably carried by the head about said second axis and rotatably connected to said toolholder, and wherein the head forms the planet-carrier of said epicycloidal gearing.

By virtue of the above solution, the power of both motors can be used for moving either the head or the toolholder, or can be split between the head and the toolholder. With respect to the case in which each motor is dedicated to a respective axis, the solution according to the present invention enables the capacity of the motors to be halved, without changing the power available on each axis when they are driven singularly. In addition, the particular disposition of the gear support members and load-bearing parts, enables manufacturing of a particularly compact head and particularly adapted to permit the connection of two different take-up tools which can be operated independently.

BRIEF DESCRIPTION OF THE DRAWING

Characteristics and advantages of the present invention will become clear in the course of the detailed description which follows, given purely by way of non-limiting example, with reference to the attached drawings, in which.

BEST MODE FOR CARRYING OUT THE INVENTION

Figure 1:
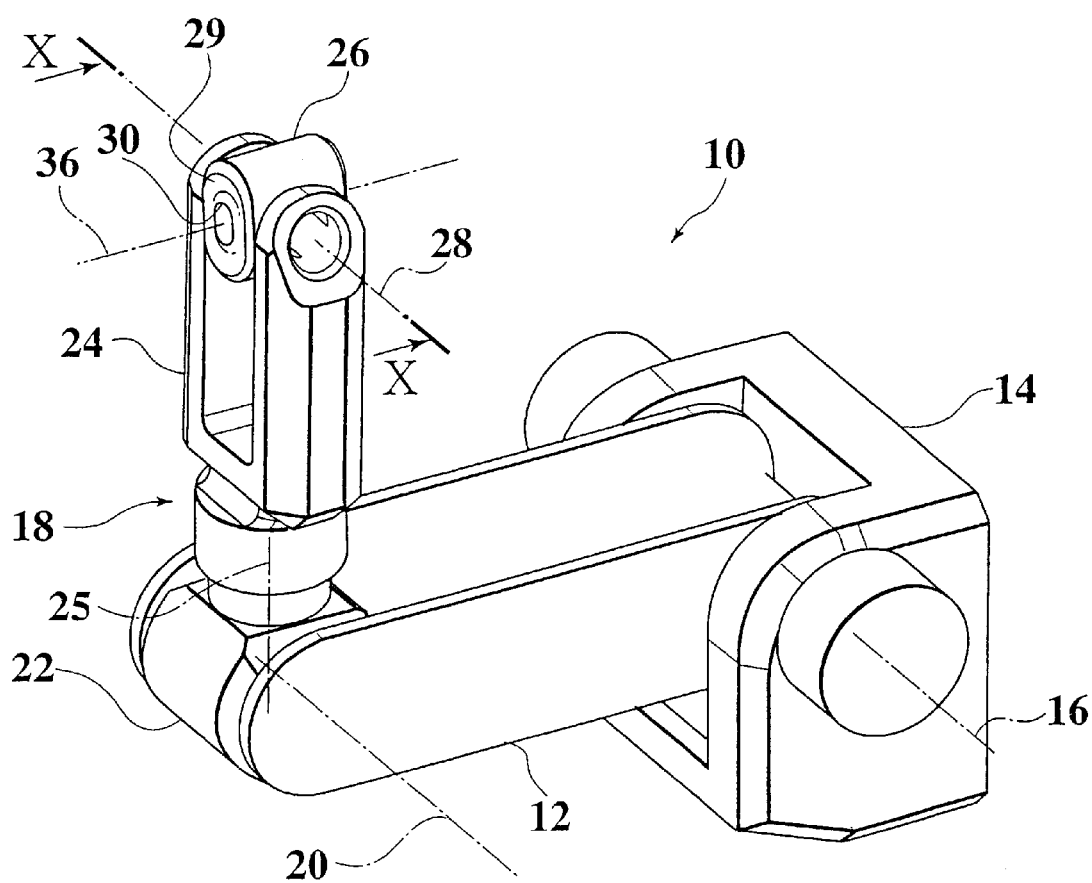
FIG. 1 is a perspective view of an automatic manipulator intended to be used in a bending system according to the present invention.
Figure 2:
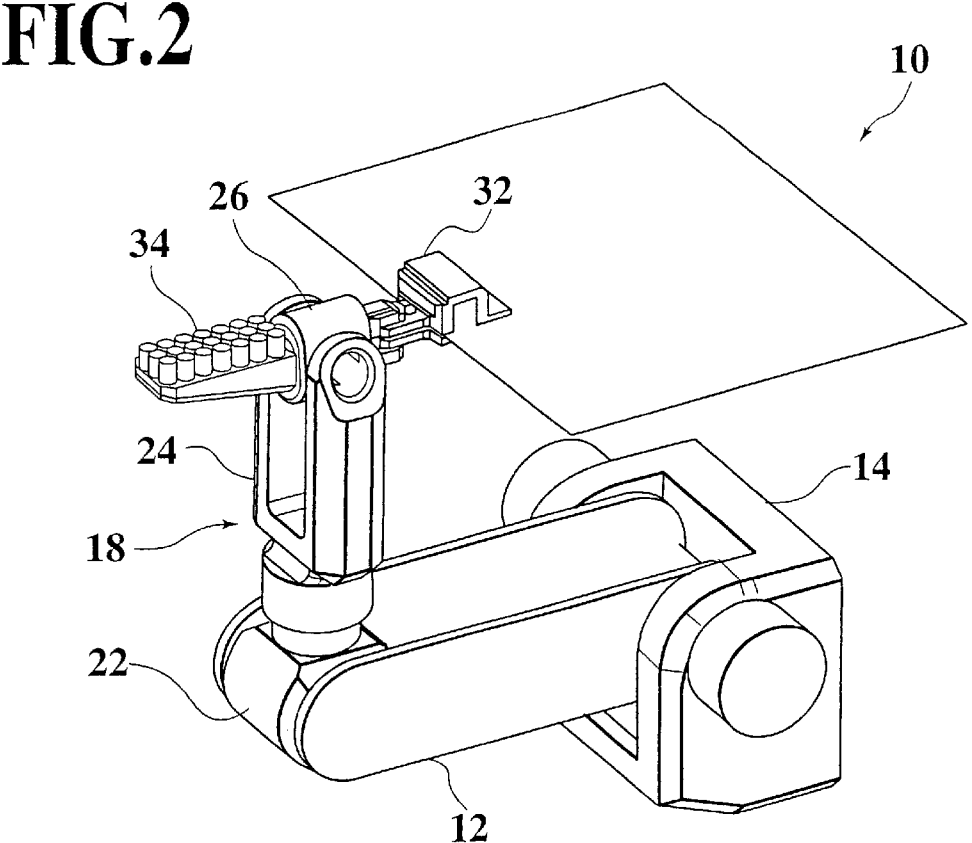
FIGS. 2 to 5 are perspective views showing different operating conditions of the manipulator of FIG. 1.
Figure 3:
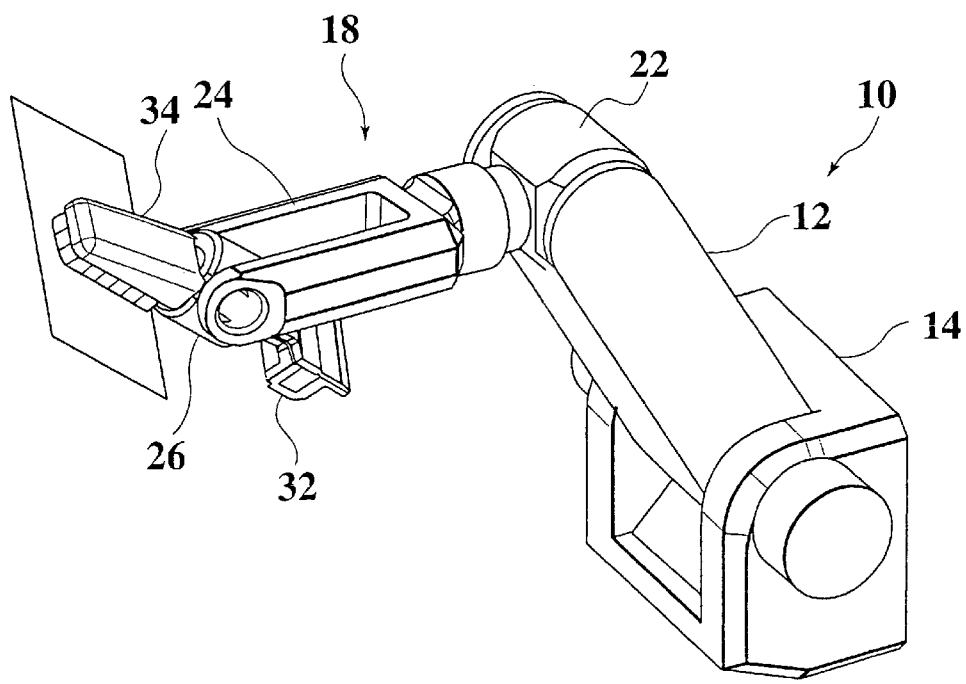

With reference to FIG. 1, the numeral reference 10 indicates a manipulator comprising a first arm 12 rotatably mounted on a base 14 about a horizontal axis 16. A second arm 18 is rotatably carried by the first arm 12 about a second axis 20 parallel to the first axis 16. The second arm 18 comprises a base portion 22 and a fork-shaped arm 24. The base portion 22 is connected to the arm 12 for rotation about the axis 20 whereas the fork-shaped arm 24 is rotatably mounted on the base portion 22 about an axis 25 orthogonal to the second axis 20. A head 26 is rotatably mounted at the end of the fork-shaped arm 24, about an axis 28 orthogonal to the axis 25. The manipulator 10 comprises numerically controlled motors (not shown) for controlling the rotations of the single elements about the axes 16, 20, 25 and 28, so that the head 26 can be positioned in any point and with any orientation in a predetermined work space. The head 26 carries a toolholder 29 having two attachment seats 30 diametrically opposed to each other, only one of which is visible in FIG. 1. As shown in FIGS. 2 and 3, the attachment seats 30 of the head 26 are adapted to receive respective take-up members 32, 34. In the example shown in the figures, the take-up member 32 is formed by a gripper and the take-up member 34 is formed by a take-up device with aspirating suckers.

Figure 6:
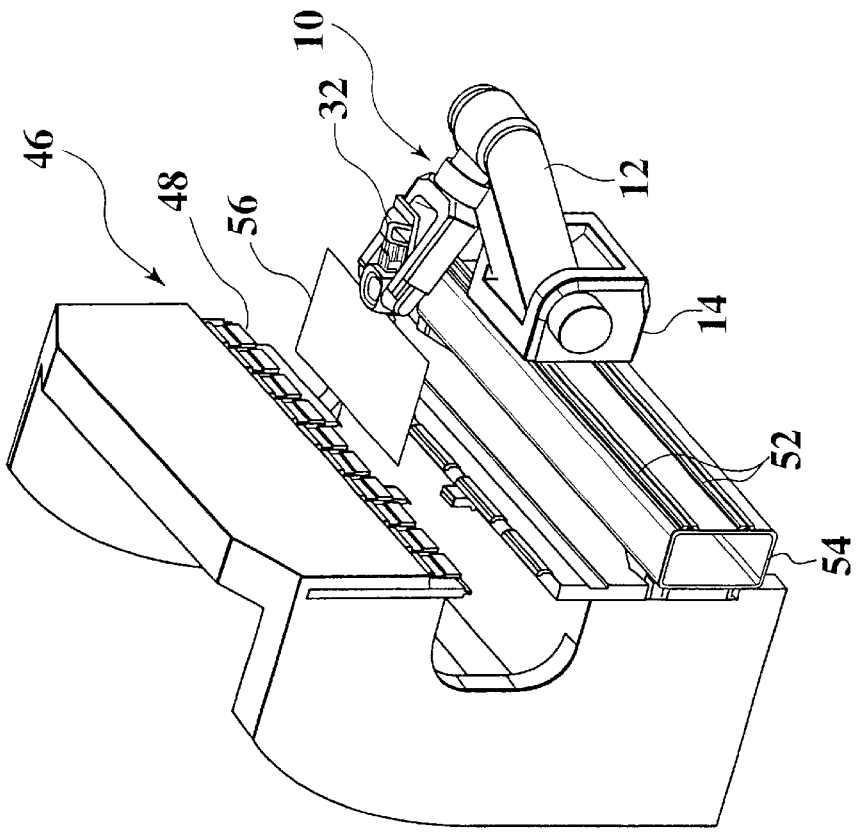
FIGS. 6 and 7 are perspective views showing a bending system according to the invention which carries out a bending operation on a piece of sheet metal.
Figure 7:
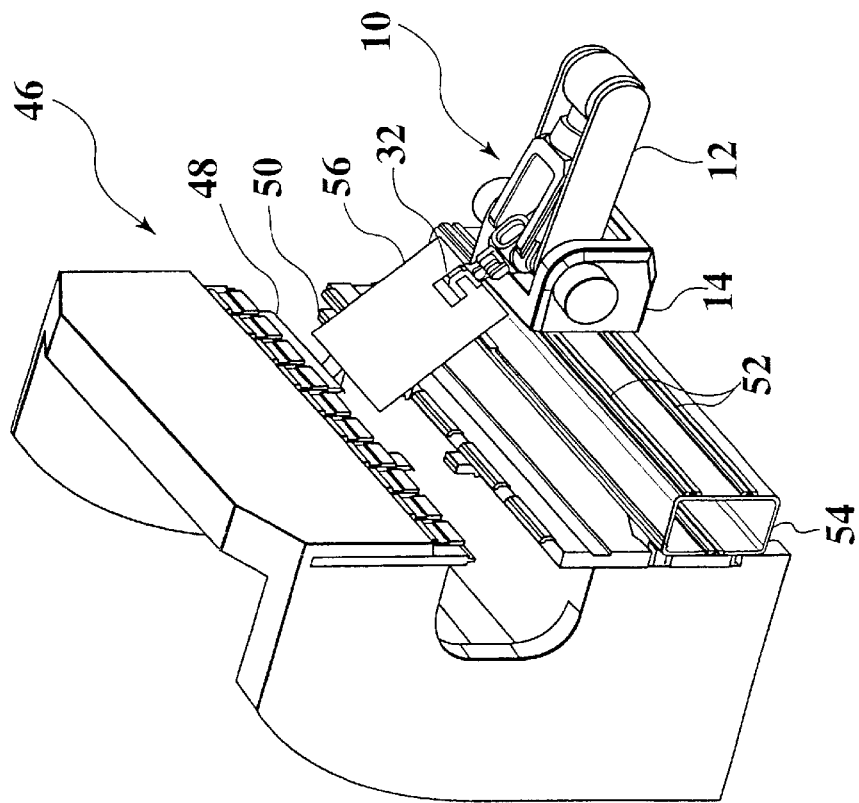

As shown in FIGS. 6 and 7, by virtue of the fact that the take-up members 32, 34 are placed in diametrically opposed positions, they do not interfere with each other during the operation. In addition, the shape of the fork-shaped arm 24 of the arm 18 avoids that the take-up member which is in an inoperative position interferes with the arm 18. The toolholder 29 is connected to the head 26 for rotation about an axis 36 (FIG. 1) orthogonal to the axis of rotation 28 of the head 26. A preferred embodiment a mechanism for controlling the rotation of both the head 26 and the toolholder 29 is disclosed in detail in a contemporaneous patent application of the same Applicant titled "A manipulator having a head including an epicycloidal gearing". During the operation, the take-up members 32, 34 are fixed to the toolholder 29 and rotate together about the axis 36. Pipes for feeding pressurized fluid to the gripper 32 and to the take-up member 34 are also arranged in the head 26. Per se known means based on the Venturi principle are provided on the sucker take-up member, such means using the pressure of the fluid for providing a depression which defines the holding state of the suckers.

Figure 4:
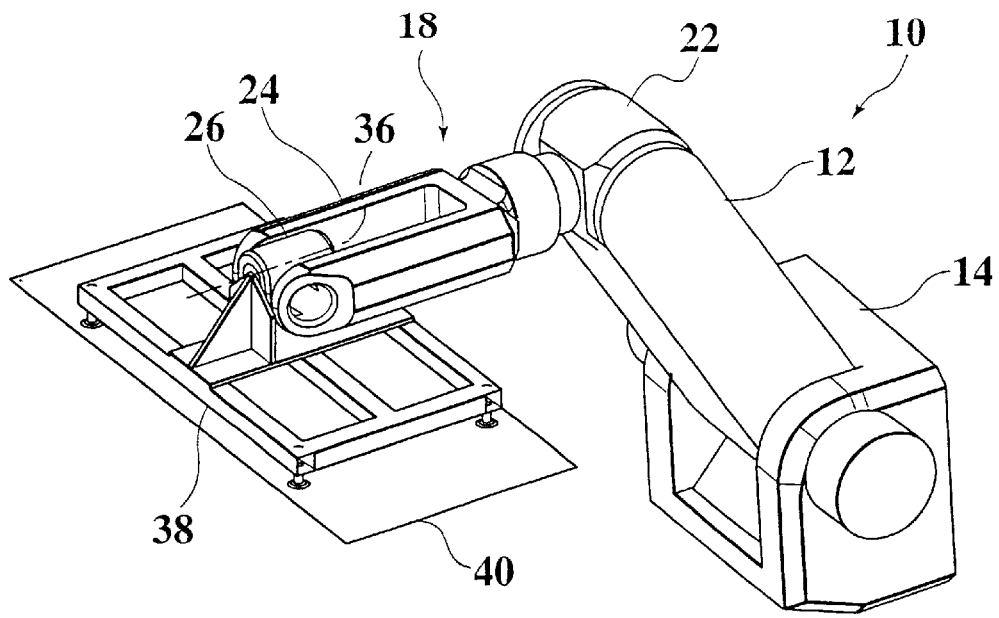
Figure 5:
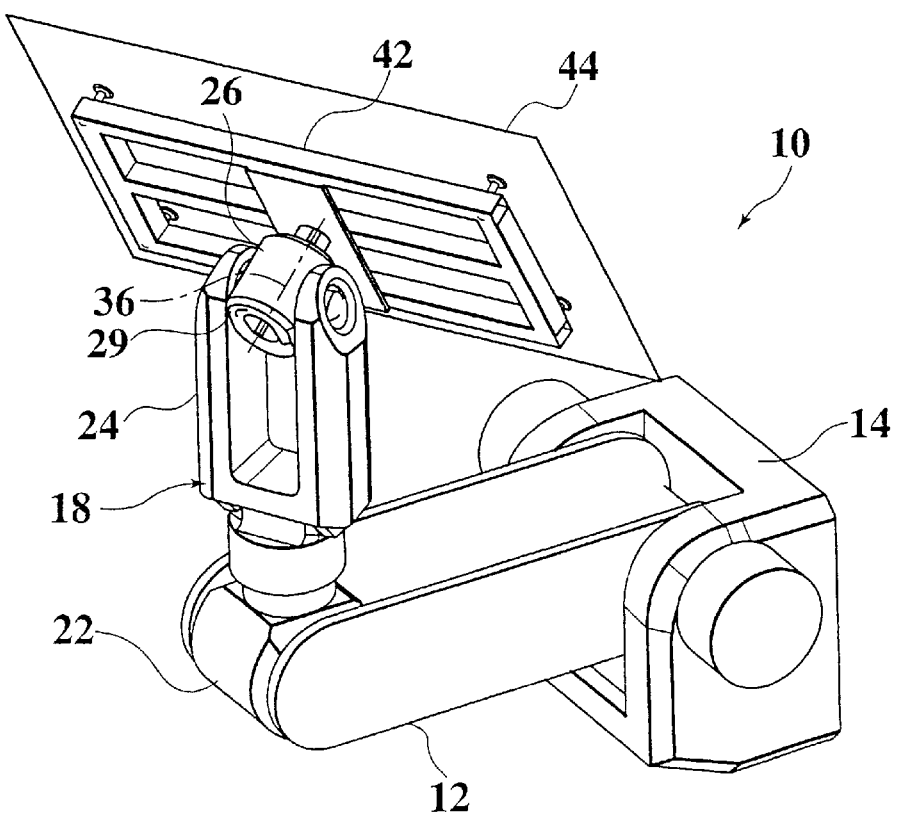

The take-up members 32, 34 can be removed by the head 26 for being replaced by take-up members of a different type. For instance, FIG. 4 shows the case in which the head 26 carries a take-up frame 38 arranged so as to take-up a piece of sheet metal 40 along a plane parallel to the axis of rotation 36. FIG. 5 shows the case in which the head 26 carries a sucker take-up frame 42 which takes-up a piece of sheet metal 44 along a plane orthogonal to the axis 36.

FIGS. 6 to 9 show an integrated bending system including the previously disclosed manipulator 10 and an automatic bending press 46 provided with mutually cooperating bending tools 48, 50. The base 14 of the manipulator 10 is slidably mounted along guides 52 carried by a beam 54 and extending parallel to the bending plane defined by the tools 48, 50.

Figure 8:
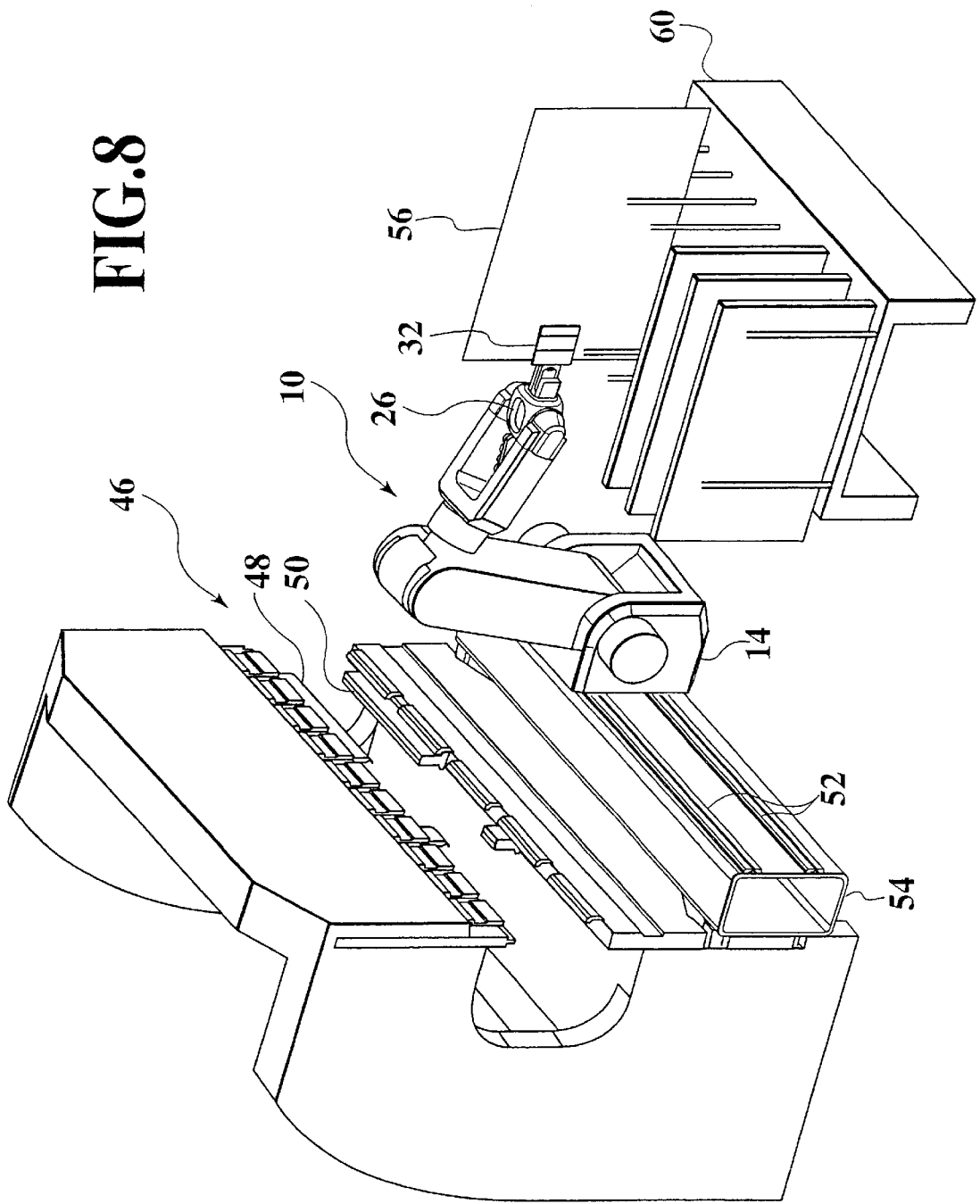
FIGS. 8 and 9 are perspective views showing the bending system according to the invention during pick-up and release operations of pieces of sheet metal.
Figure 9:
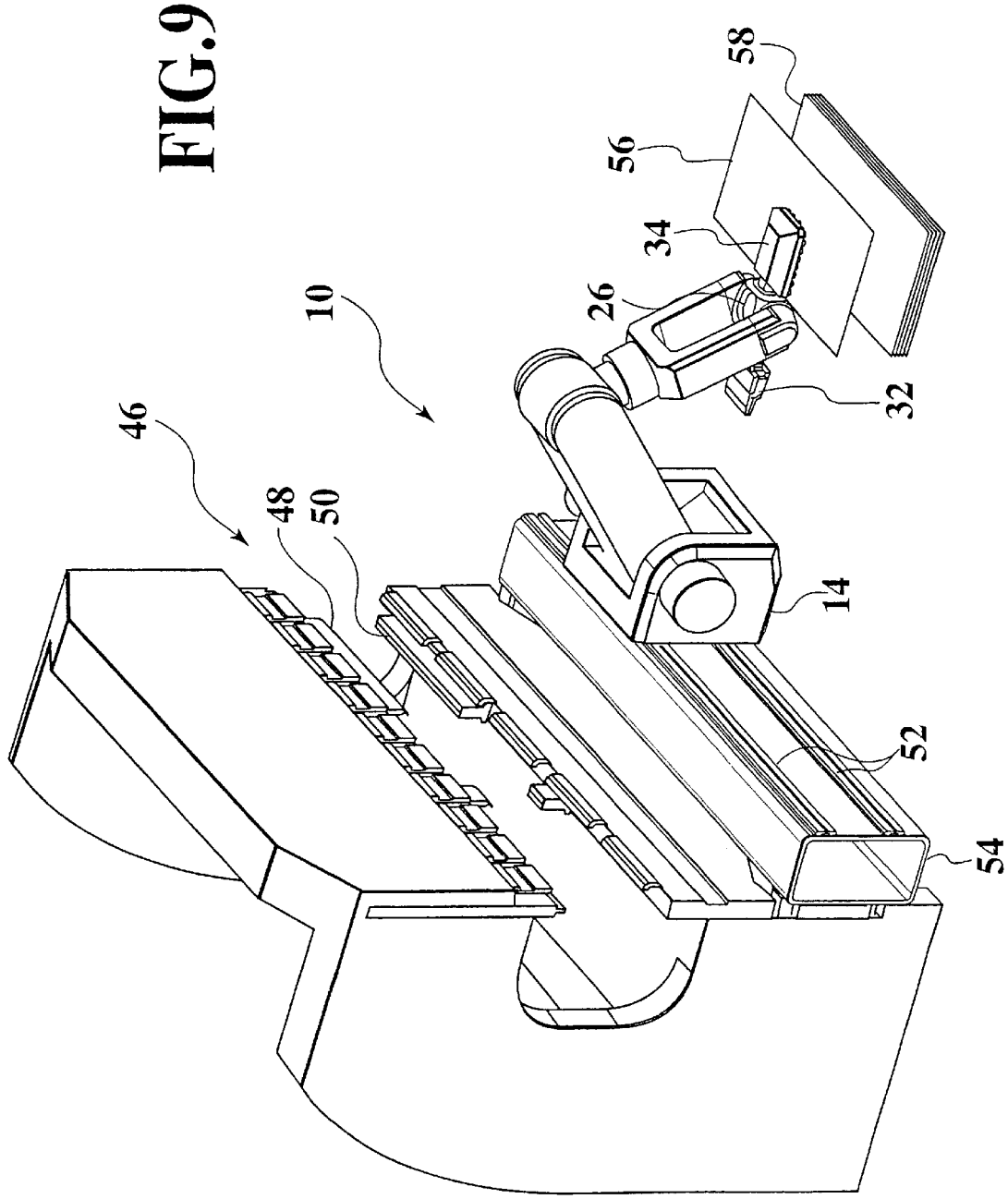

As shown in FIG. 9, the manipulator 10 according to the present invention can use the sucker take-up members 34 for picking-up a sheet 56 from a pack 58. The sucker take-up member 34 can also be used for presenting the piece of sheet metal 56 to the bending press 46 as shown in FIG. 7. During one bending cycle on a piece 56, the manipulator 10 can change the pick-up member which holds the piece 56. For using the gripper 32 in replacement of the sucker take-up member 34, the piece of sheet metal 56 is momentarily held between the bending tools 48, 50 of the bending press 46. While the piece is held by the bending tools, the sucker take-up member 34 is deactivated, the head 36 is rotated about the axis 28 for bringing in a take-up position the gripper 32 and then the piece 56 is gripped by the gripper 32. The same procedure is used when it is necessary to change the position of the piece to be bent with respect to the take-up members. FIG. 6 shows an operating condition of the bending system in which the piece of sheet metal 56 is held by the gripper 32. The gripper 32 can also be used for releasing the piece of sheet metal 56 at the end of the bending cycle in a storage device 60, as schematically shown in FIG. 8.

Referring now to FIGS. 10–14, a second embodiment of the present invention will be described hereinbelow.

The main aspect of the present invention consists in the way in which the movement of the head 26 about the first axis 28 and the movement of the toolholder 29 about the axis 36 are controlled.

Figure 10:
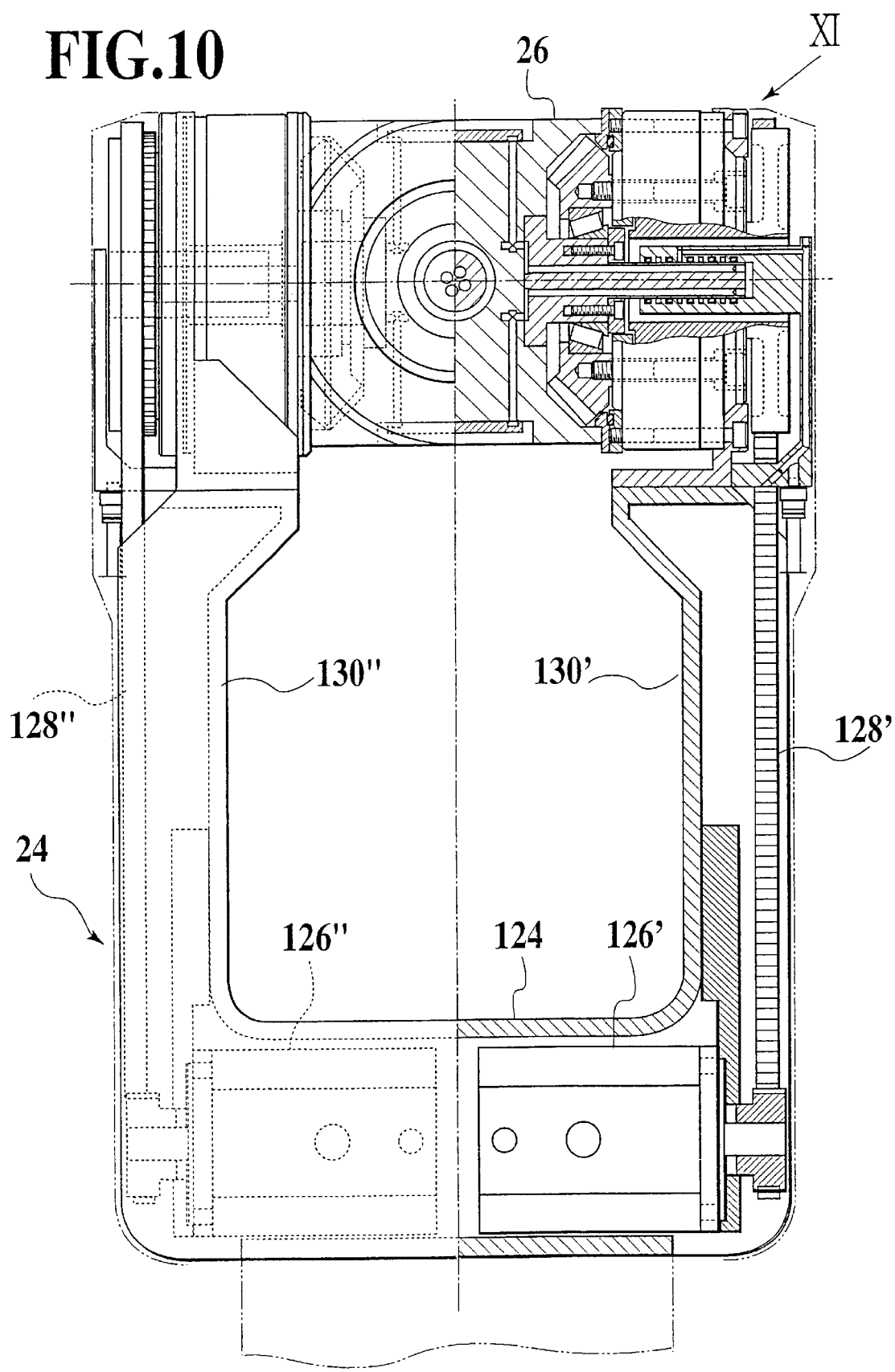
FIG. 10 is a partial cross-section in a greater scale taken along the line X—X of FIG. 1.

With reference to FIG. 10, the fork-shaped arm (fork-shaped portion) 24 has the base 14 in which two electric motors 126', 126" are housed. The motors 126', 126" drive respective toothed belts 128', 128" which extend within respective branches 130', 130" of the arm 24.

Figure 11:
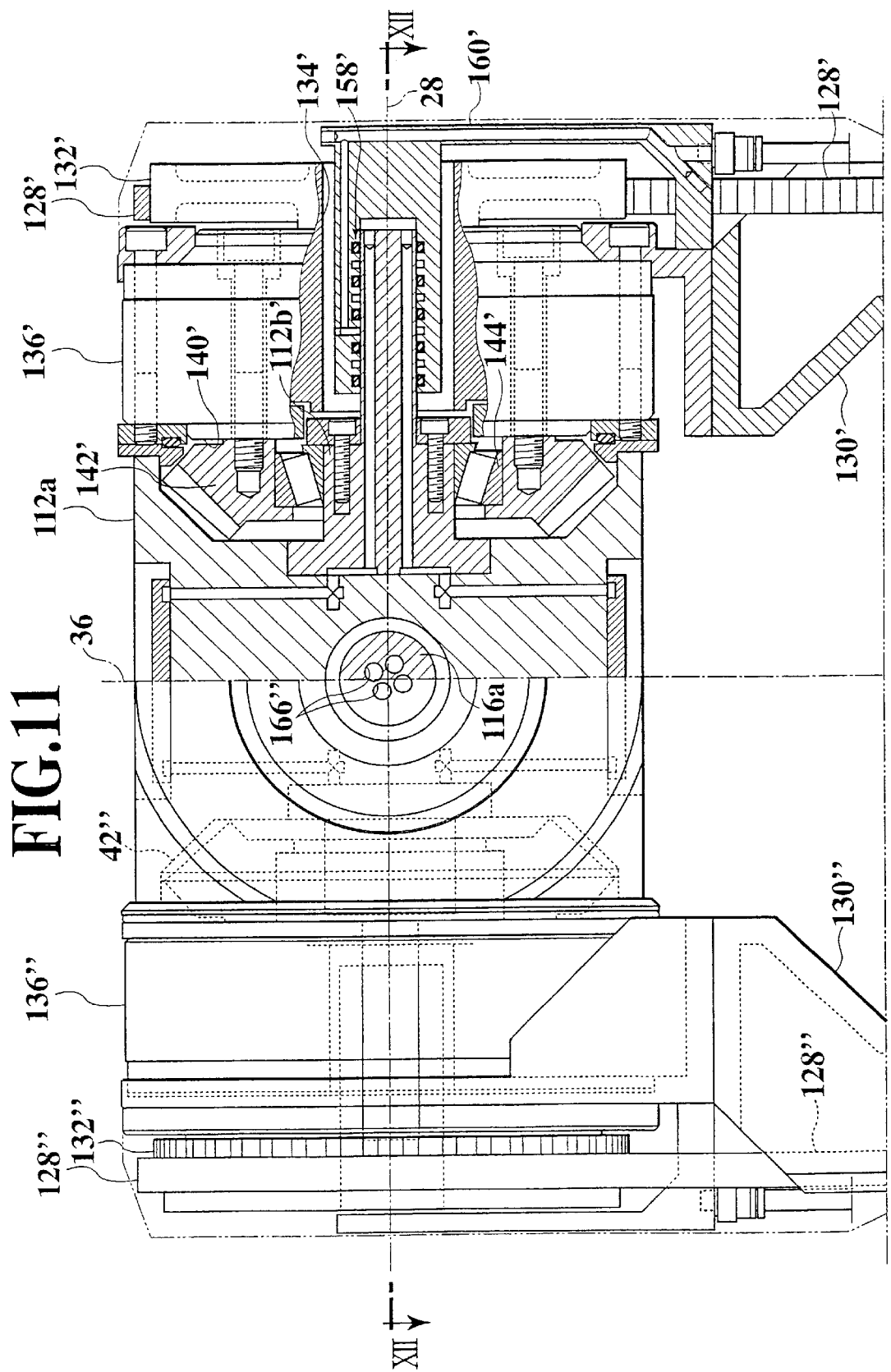
FIG. 11 shows in a greater scale the part indicated by the arrow XI in FIG. 10.
Figure 12:
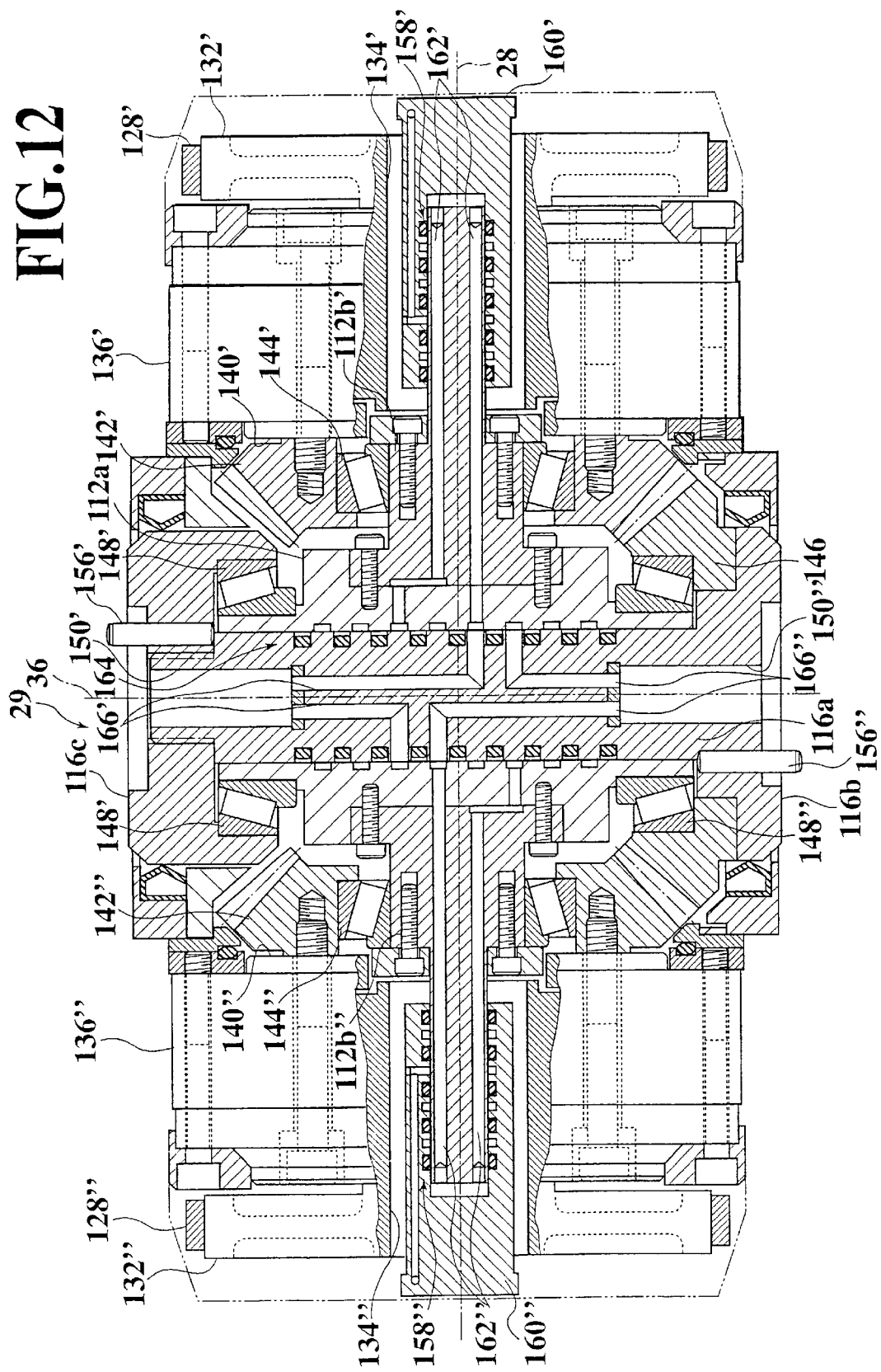
FIG. 12 is a cross-section taken along the line XII—XII of FIG. 11.

With reference to FIGS. 11 and 12, the toothed belts 128', 128" cooperate with respective pulleys 132', 132" fixed to input members 134', 134" of respective reduction units 136', 136". The reduction units 136', 136" are normal commercially available reduction gear for industrial robots. The outer housing of the reduction units 136', 136" are fixed to the ends of two branches 130', 130" of the fork-shaped arm 24. The reduction units 136', 136" have respective output members 140', 140" rotatable about axis 28 and supported by bearings (not shown) placed inside the reduction units 136', 136". The output members 140', 140" are fixed to bevel gears 142', 142" both coaxial to the axis 28 and rotatable thereabouts.

Referring always to FIGS. 11 and 12, the head comprises a central body 112a to which a pair of shafts 112b', and 112b" are fixed, the shafts being coaxial with the axis 28. The head is carried for rotation about axis 28 by a pair of roller bearings 144', 144" arranged inside the bevel gears 142', 142". The central part 112a of the head is hollow and carries internally the toolholder 29 which is formed by a shaft 29 provided at both ends with flanges 116b and 116c (FIG. 12). The flange 116b is integral with the shaft 116a whereas the flange 116c is fixed to the shaft 116a by means of a threaded joint. A planet gear 146 meshing with both bevel gears 142', 142" is fixed on the flange 116b. The toolholder 29 is rotatable with respect to the head 26 about the axis 36 and is supported by a pair of bearings 148', 148".

Figure 13:
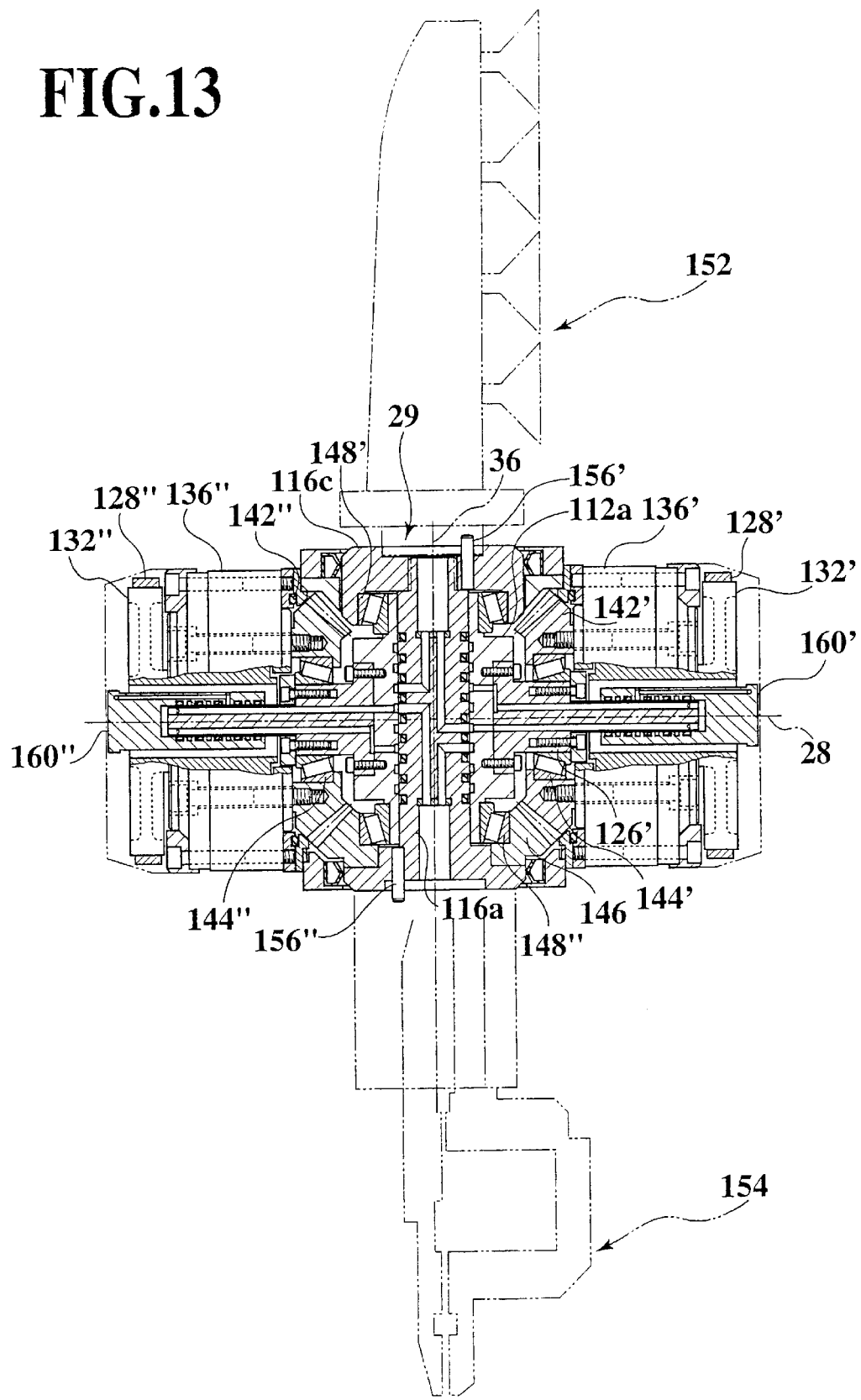
FIG. 13 is a cross-section similar to FIG. 12, showing the head provided with two tools.

The bearing 148' is placed between the central portion 112*a* and the flange 116*c* whereas the bearing 148" is placed between the central portion 112*a* and the planet gear 146. The shaft 116*a* has at its ends seats 150', 150" in which respective attachment portions of a pair of tools, indicated at 152 and 154 in FIG. 13, are intended to be inserted and locked. In the example shown in FIG. 13, the tool 152 is formed by a sucker take-up member and the tool 154 is formed by a gripper.

The toolholder 29 has at its opposite ends pins 156', 156" serving for angularly positioning the tools 152, 154 and for connecting in rotation the tools to the toolholder 29. The head-toolholder assembly shown in the figures, is also provided with means for feeding pressurized fluid to the connecting seats 150', 150" of the toolholder 29. As shown in particular in FIG. 12, such means comprise a pair of rotating pneumatic manifolds 158', 158" which connect manifold elements 160', 160" fixed to the arms 24, to respective pipes 162', 162" which extend inside the shafts 112*b*' and 112*b*" of the head 26. The pipes 162', 162" are connected to a second rotating pneumatic manifold 164 placed between the central part 112*a* of the head 26 in the shaft 116*a* of the toolholder 29. The rotating manifolds 158', 158" and 164 are formed, in a way per se known, by a plurality of annular grooves isolated from each other by o-rings. Pipes 166', 166" are formed inside the shaft 116*a*, and feed pressurized fluid to the tools 152 and 154.

Figure 14:
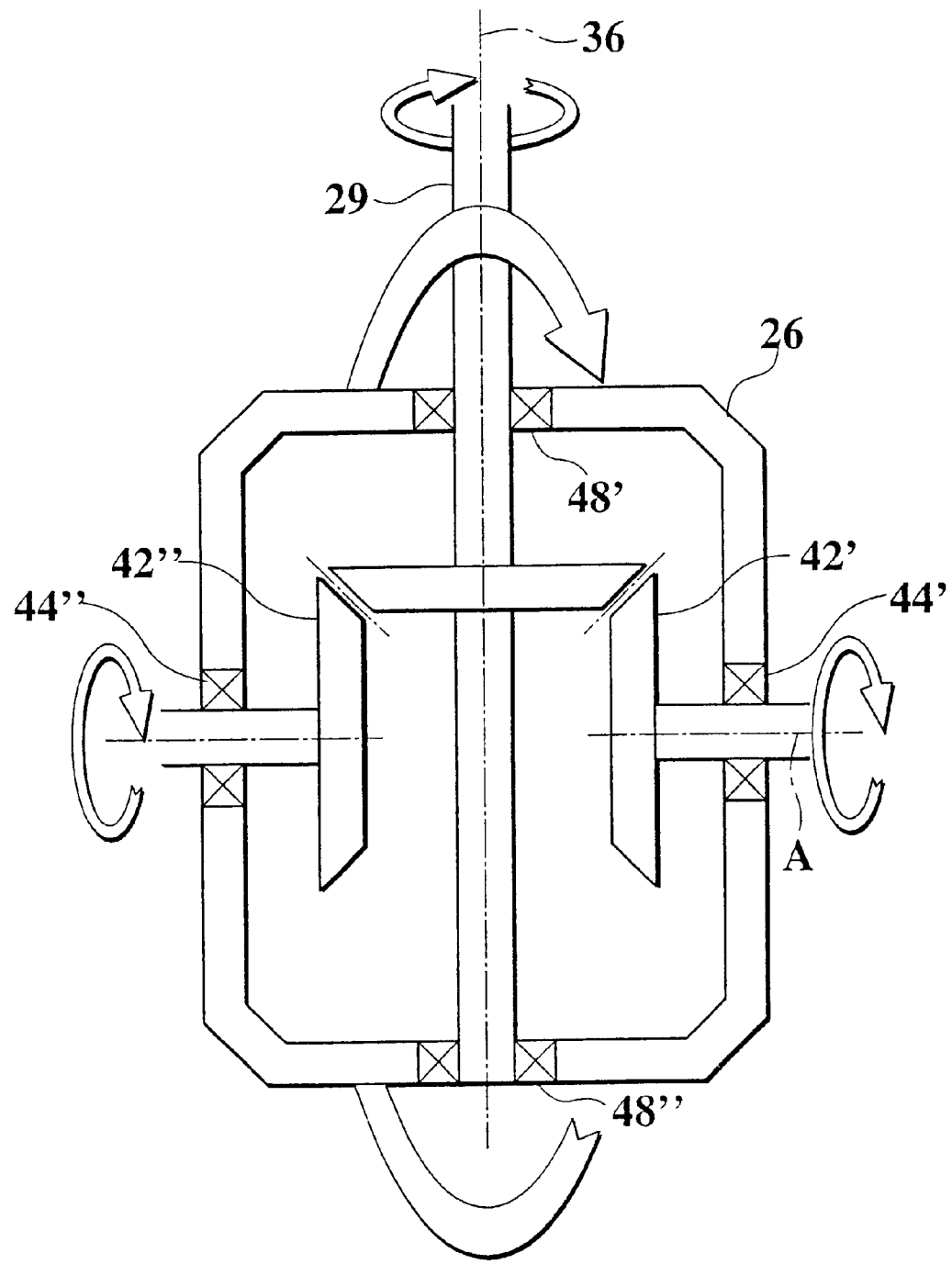
FIG. 14 is a diagram showing the operating principle of the head according to the invention.

FIG. 14 schematically shows the operating principle on which the present invention is based. The two bevel gears 142', 142" are driven in rotation by respective motors independently from each other. These two bevel gears form the input members of an epicycloidal gear in which the head 26 forms the planet-carrier. The planet gear 146 meshes with both input gears 142' and 142" and is connected for rotation with the shaft 29 forming the toolholder. From the diagram of FIG. 14 it will be understood that when the two input gears 142', 142" rotate in opposite directions and with the same speed, the head 26 remains stationary whereas the toolholder 29 rotates about the axis 36. On the contrary, when the gears 142' and 142" rotate in the same direction with the same speed, the gear 146 and the toolholder 29 do not rotate about the axis 36 and the head 26 rotates about the axis 28. When the two gears 142', 142" are driven in rotation with different speed, a rotation of the head 26 about the axis 28 and a contemporaneous rotation of the toolholder 29 about the axis 36 are obtained. Therefore, on each axis 28 or 36 can be concentrated a power equal to the sum of the powers of the two motors 126', 126" when the two axis are driven singularly. When the two axis 28 and 36 are driven at the same time, the total power will be split proportionally to the speed of rotation of the axes.

Naturally, while the principle of the invention remains the same, the detail of construction and the embodiment may widely vary with respect to what has been described and illustrated without thereby departing from the scope of the invention as defined by the claims which follow.

What is claimed is:

1. An automatic bending system, comprising:
    an automatic bending press (46) including a pair of bending tools (48, 50) cooperating which each other,
    an automatic manipulator (10) including a head (26) movable in a work space and provided with a toolholder member (29) intended to receive at least two take-up members (32, 34, 38, 42) independent from each other,
    wherein the head (26) is rotatable about a first axis (28) and is carried by a fork-shaped arm (18) that is rotatable between two branches of said arm, the fork-shaped arm (18) comprising a support (22) which is rotatable about an axis (20) parallel to the axis of rotation (28) of the head and a fork-shaped portion (24) which is rotatable about a support (22) about an axis (25) orthogonal to the axis of rotation (28) of the head (26), and
    the toolholder member (29) being provided with two tool attachment seats (30) arranged on opposite sides of said first axis and rotatable about a common second axis (36) orthogonal to the first axis (28).

2. A bending system according to claim 1, wherein said attachment seats (30) are adapted to hold in a releasable manner respective tools (32, 34).

3. A bending system according to claim 1, wherein at least one of said take-up members (32, 34, 38) is provided for taking up a piece of sheet metal along a plane parallel to its own axis of rotation (36).

4. A bending system according to claim 1, wherein at least one of said take-up members (42) is provided for taking up a piece of sheet metal (44) along a plane orthogonal to its own axis of rotation (36).

5. A bending system according to claim 1, wherein the manipulator (10) comprises a base (14) carrying a first arm (12) which is rotatable about a first axis (16), and wherein said fork-shaped arm (18) is rotatably mounted on the first arm (12) about a second axis (20) parallel to the 5 first axis (16).

\* \* \* \* \*